May 28, 1957 H. O. STUART 2,793,867
SELF ALIGNING TOOL HOLDER FOR TURRET LATHES
Filed April 5, 1954 3 Sheets-Sheet 1
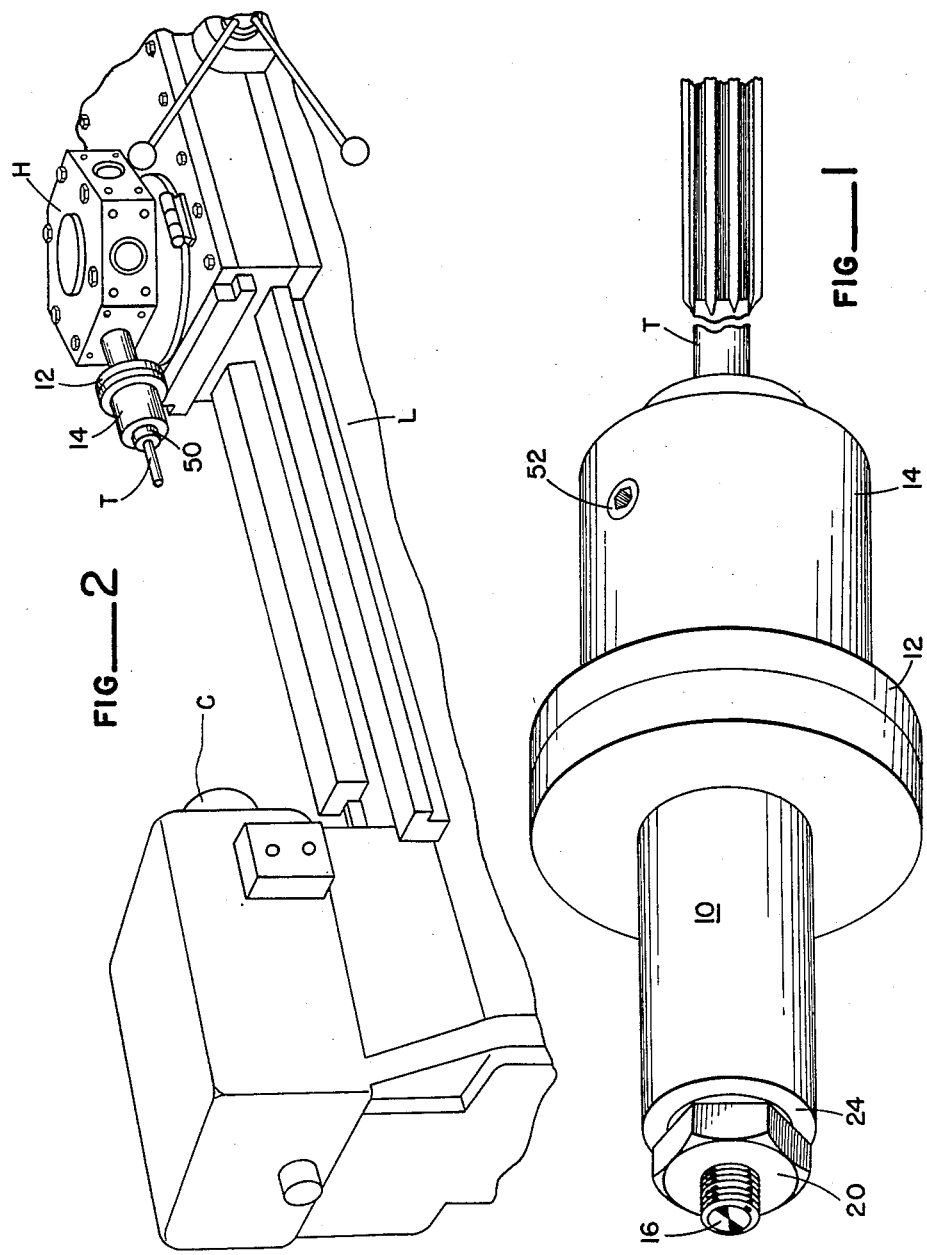
HARVEY O. STUART
INVENTOR.
BY *Smith & Tuck*

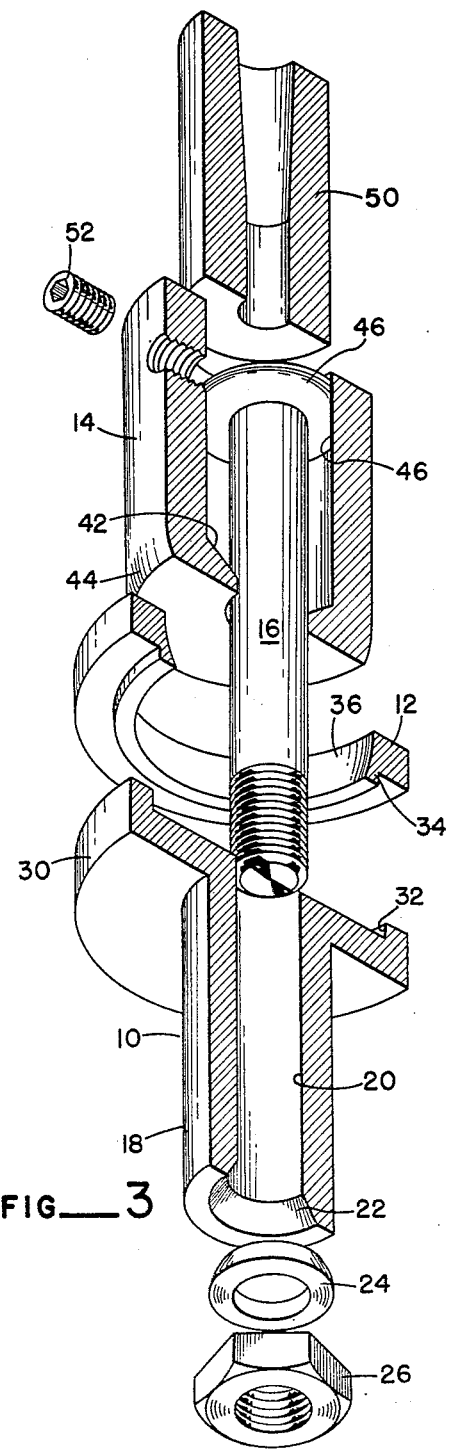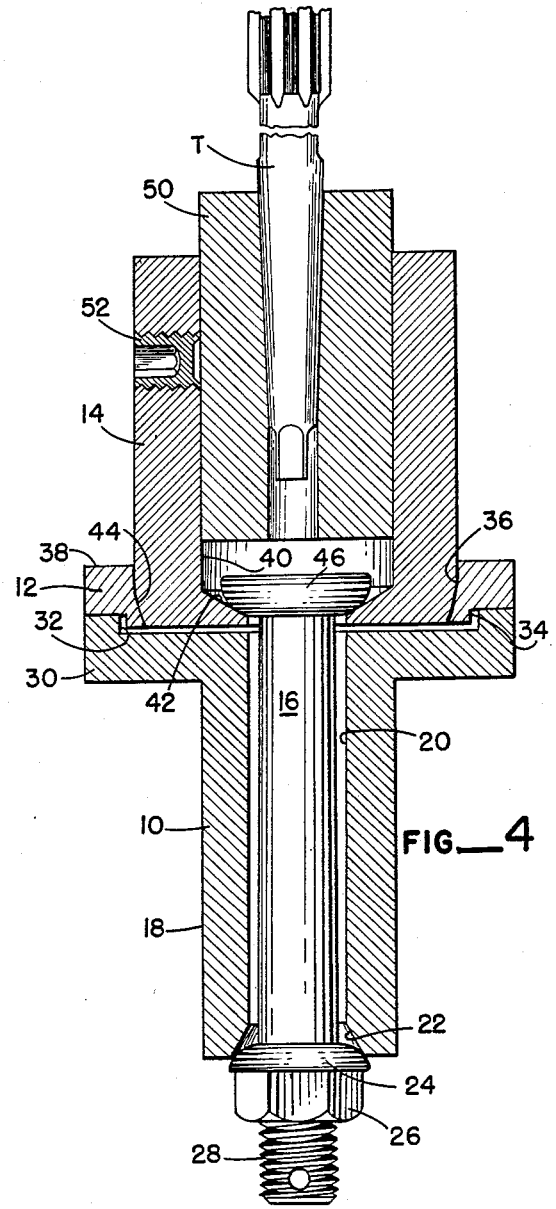

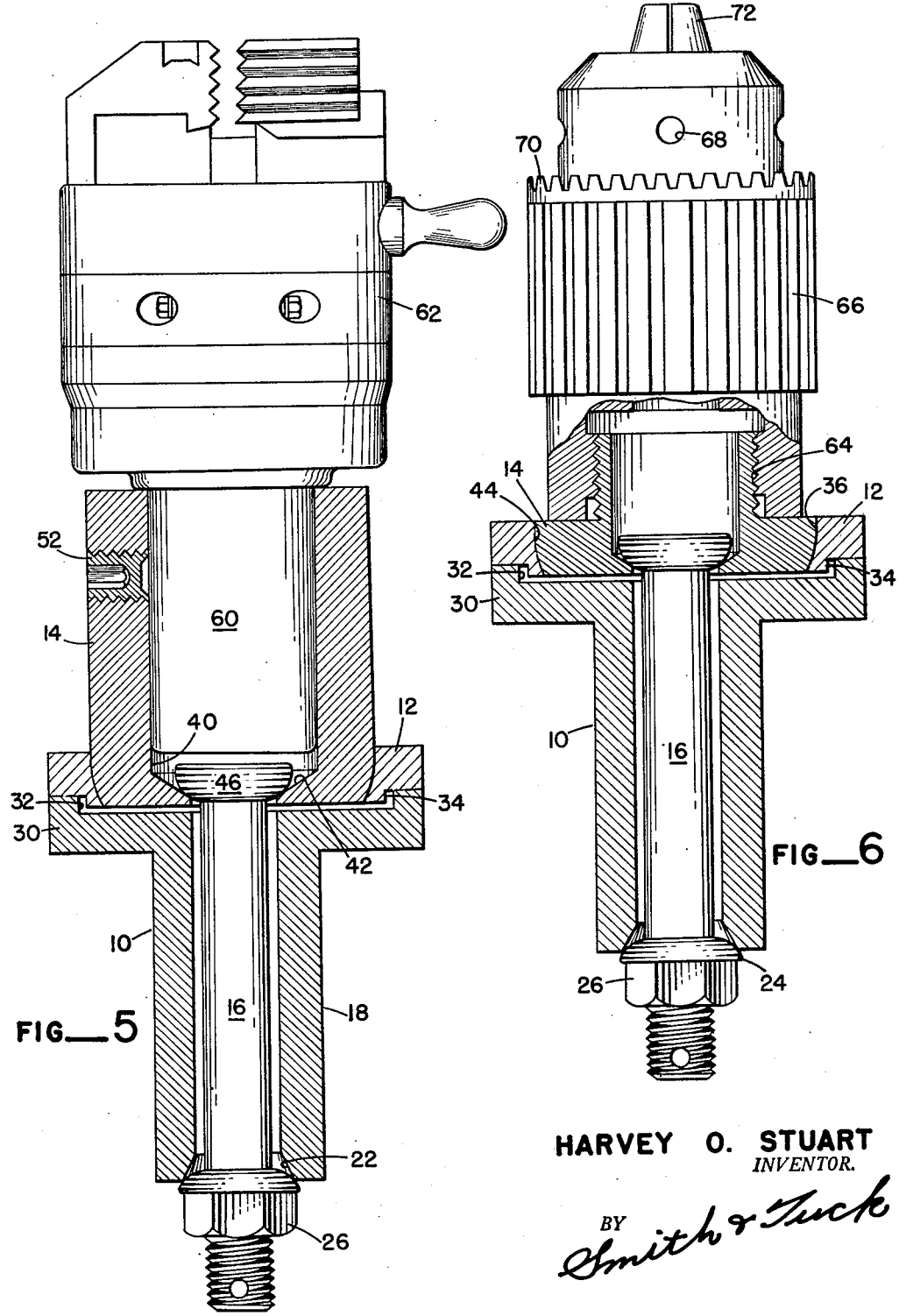

United States Patent Office 2,793,867
Patented May 28, 1957

2,793,867
SELF-ALIGNING TOOL HOLDER FOR TURRET LATHES

Harvey O. Stuart, Venice, Calif.

Application April 5, 1954, Serial No. 421,016

2 Claims. (Cl. 279—16)

This present invention consists of an intermediate holder for reamers, drills, taps, threading dies, and the like which is normally used in the stationary tool holder of turret lathes. My holder provides sufficient adjustment both axially and transversely so that the cutting tool can be axially aligned with the axis of rotation of a piece of work in a turret lathe chuck, and then when the adjustment has been accurately achieved, the same can be clamped rigidly so as to maintain it during its operational use.

Turret lathes have made it possible to produce large quantities of good work at a surprising rate of production. When high speed production, however, is joined with the necessity of accuracy of a high order, many difficulties arise. The turret lathe depends for its high output on having a plurality of tools that act in a turret arrangement so as to make the employment of the various tools a high speed sequential operation. Turret tool holders have been under development for many years but there are certain movements required. The turret normally must be capable of movement along the lathe bed, it must be capable of revolving so as to bring the successive tools into position of use, and an indexing arrangement must be provided to hold the tools in their operational position. When, however, there is the requirement of several movements, each function usually must have some tolerance, and an accumulation of tolerances all in the same sense can easily add up to an appreciable error in alignment between the axis of the tool holder in the turret head and the axis of revolution of the turret lathe chuck which is turning the work. This accumulation of error has long been recognized and many devices have been created in an endeavor to correct this deficiency of this most useful piece of equipment. However, those that have been observed have only partially solved this problem. The demand therefore is for a tool holder that will be capable of correcting this misalignment or lateral displacement of the two important axes and one which will make it possible to make this adjustment with accuracy and with the minimum of lost time. My present tool holder is self aligning and fully meets these exacting requirements.

The principal object of my present invention is to provide an intermediate tool holder which is normally seated in the tool-holding aperture of a turret and which will make it easy to correct any misalignment between the tool as held in the turret and the axis of revolution of the work-holding chuck of the lathe.

A further object of my invention is to provide a tool holder that is convenient to use and which will make it easy to correct angular misalignment of the two important axes of the machine tool and to correct lateral misalignment of these two axes.

A further object of my invention is to provide an intermediate tool holder which in most cases will permit the tool being held to seat in its own alignment with revolving work, and when this alignment has been achieved, and the adjusting means tightened by the operator, the tool holder will lock in its adjusted position.

Further objects, advantages and capabilities will be apparent from the description and disclosure in the drawings, or may be comprehended or are inherent in the device.

In the drawings:

Figure 1 is a perspective view showing the general character of my tool holder, the same being shown in conjunction with a reamer which has been broken away in part;

Figure 2 is a perspective view showing in more or less diagrammatic form the essential components of a turret lathe and illustrating the manner in which my tool holder is employed in association therewith;

Figure 3 is an exploded, perspective view illustrating the various elements making up my tool holder; some of which are shown in section;

Figure 4 is a typical longitudinal sectional view taken through a diameter of the holder illustrated in Figure 1;

Figure 5 is a longitudinal diametrical sectional view through a standard type of my tool holder and illustrating the same in conjunction with a conventional threading die head; and Figure 6 is a view, similar to Figure 5, but showing in section a modification of certain parts so as to adapt the same to a head stock chuck. This arrangement through its wide range of adjustability, makes it possible to employ a wide variety of boring, cutting or threading tools.

Referring more particularly to the disclosure in the drawings, the numeral 10 designates the hub portion of my tool holder. Associated with the hub portion is the spherical seat portion 12, the aligning member 14, and the tension bolt 16. Member 10 has its outer surface 18, of the hub, machined preferably cylindrically so that it may be used with standard tool holders such as are employed in the turret head H of a typical turret lathe L. Concentrically disposed with respect to the outer surface 18 is the interior bore 20 which terminates at its outer end in the coned counterbore 22. This coned counterbore is adapted to seat the spherical surface of washer 24 to the end that when nut 26 is tightened on the threaded portion 28 of bolt 16, the washer and the enclosed portion of tension bolt 16, will be centered in counterbore 22. At its opposite end hub portion 10 is provided with an outwardly extending flange 30 which flange is counterbored at 32 in the manner illustrated in Figures 4, 5, and 6.

Counterbore 32 is adapted to receive loosely, and to merely act as a limiting positioning arrangement, the inwardly extending cylindrical lip 34 of the spherical seat member 12. The cylindrical portion 34 should have a diameter sufficiently smaller than counterbore 32 so that considerable movement can take place between members 10 and 12 when the same are employed for aligning axes which may be offset from each other, the amount of clearance provided determining the adjustable range of these two members 10 and 12. The inner surface of member 12 is machined as a portion of a spherical surface the center of the sphere being slightly above, as viewed, from surface 38 with the center being on the axis of revolution of portion 12. There are no securing bolts or other clamping means for the portion 12 excepting the tightening bolt 16 which applies its pressure indirectly through the aligning member 14.

Aligning member 14 is generally formed in the shape of a bushing having an interior bore 40 and a conical seat portion 42. The outer surface of member 14 on its lower end, as viewed in Figures 4, 5, and 6, is provided with a spherical surface 44 adapted to coact with spherical surface 36 of the seating portion 12. These spherical portions 36 and 44 are machined with the same center of spherical surface and with radii that are substantially equal, different only in the slight amount of clearance required so that a coacting ball joint effect can be achieved. Adapted to seat on the interior conical portion 42 is the bolt head 46 of bolt 16. The working rim surface of head 46 is spherical in form and thus provides a centering means for the right hand end of bolt 16 so that when tension is applied, the bolt head 46 is seated concentrically with the bore of member 14. Washer 24 provides that the lower end of 16 will also be concentric with bore 20. It follows of course that if the aligning member 14 has its axis displaced from that of hub portion 10, the tension bolt 16 will not have its axis coinciding with the longitudinal axis of bore 20. For this reason bore 20 must be considerably larger than the diameter of bolt 16 so as to admit of reasonable displacement of members 10 and 14. Any such displacement of course harbors a corresponding displacement of the vertical seat portion 12 which of necessity must move with the aligning member 14. In this arrangement indicated, it will be apparent it is believed that the hub portion 10 and aligning member 14 may have their axes angularly disposed with respect to each other, or the axes of the two members might be parallel, but displaced from each other. Under some circumstances it may be desirable that both of these adjustments be taken advantage of at the same time to insure the accurate positioning of tool T, with respect to the work turning chuck C. The bore 40 of member 14 may be arranged in any convenient manner to receive adapter members as the hollow tool arbor 50 which in Figure 4 is shown as holding a fluted reamer and using a Morse taper bore. Under such conditions the arbor 50 is held in place by a headless set screw as 52.

Referring to Figure 5, the same general form of holder is employed as in Figure 4 excepting that the hollow tool arbor 50 is removed and the aligning member 14 is bored to a diameter to accommodate the hub 60 of a standard threading die head 62. The form I have shown is the "Landis." There are a number of like types of equipment which can be similarly adapted and the aligning advantages of my tool holder may be made available for use with this type of equipment.

In Figure 6 I have illustrated a modified form of alignment member 14 wherein the cylindrical portion has been cut off in length and threaded at 64 so as to accept a standard head stock chuck. With this arrangement the full alignment facilities are available and the chuck may be used for securing a wide range of metal cutting tools. In Figure 6, the "Jacobs" head stock chuck has been illustrated as being representative of this form of chuck. This particular form of chuck 66 is the type known as a key type in which a key having a pilot to fit opening 68 is employed so as to cause a beveled gear to mesh with gear teeth 70 and in this manner open and close jaws 72.

*Method of use*

This present tool holder embodies a modified form of ball and socket joint. This permits angular adjustment of the tool holder as 50 merely by the partial rotation of the alignment member 14 within the ball and socket arrangement provided by surfaces 36 and 44. Secondly the spherical seat portion 12 and the aligning member 14 are capable of joint movement laterally of hub portion 10 in any direction so that any parallel displacement of axes of members 10 and 14 can be compensated for within the range of adjustment provided by counterbore 32 and lips 34. Using my tool holder, whether it be drills, reamers, taps, gun drills or die heads, perfect results can be achieved even though the turret may be out of alignment up, down, or sideways as much as 1/32 of an inch, and several degrees angular, as well. Normally machine tools of standard make and in reasonably maintained condition do not have any such errors. Usually their errors of misalignment are only matters of thousandths of an inch and these small errors are very easily compensated for by this device.

As an example when lining up a tap it has been found that by starting the tap in a few threads and then loosening the locking nut 26, and turning the work slowly, with a light pressure on the unit, the device will automatically line up perfectly. Then by holding a light pressure, stopping the machine, and tightening the locking nut 26, the parts are secured in axial alignment and perfect threads can then be cut throughout the run of work undertaken. When adjustment is made in this manner it usually results in the first piece of work being up to standard, and then experience has shown that hundreds of pieces of work can be run without further adjustment. When handled in this way, whether it is a drill, tap, reamer, or die head, the tool will automatically line up, with the axis of revolution of the work, then by tightening the locking nut 26, will retain the perfect alignment.

It is believed that it will be clearly apparent from the above description and the disclosure in the drawings that the invention comprehends a novel construction of a tool holder for turret lathes.

Having thus disclosed my invention, I claim:

1. An intermediate tool holder to be held in a primary tool holder and to hold a tool, comprising: a hub member having a longitudinal bore having an outwardly flaring conical seat formed at one end of the hub member and said hub member having an annular flange at its opposite end counterbored in its end surface, the outer surface of said hub member throughout its major extent being of smaller diameter than said flange of a size to be held in such primary tool holder, an annular seat member of approximately the same diameter as said annular flange positioned abutting the flanged end of said hub member and having a cylindrical mating portion, of smaller size, extending into said counterbore and said seat member having a seat formed as a portion of a sphere with the center of the sphere concentric with the seat member and disposed outward thereof; an aligning member having means to hold a tool at one end and having an exterior surface at its other end formed as a portion of a sphere fitting said seat in said seat member, said aligning member having a central opening with a restricted mouth at one end having an interior surface in the form of a cone, a headed tension bolt, carrying a washer and a nut, extending through the bore in said hub member with the inner surface of the head being spherical and bearing on the conical mouth surface of said aligning member and with the inner surface of the washer being spherical and bearing on the conical seat of said hub member and said nut being positioned on the outside of said washer, the hub bore being larger than said bolt, whereby angular pivoting and parallel displacement is permitted between the axes of hub and aligning members.

2. An intermediate tool holder to be held in a primary tool holder and to hold a tool, comprising: a hub member adapted to be secured at one end in such primary tool holder in axial alignment therewith and an aligning member having means operative to hold such tool at one end thereof in axial alignment with the aligning member, means connecting together the other ends of said hub and aligning members including a tension bolt and means making a universal, pivotal joinder of the tension bolt to the hub and aligning members including ball means on the ends of the bolt and socket means on the hub and aligning members in which the ball means are seated permitting limited lateral parallel displacement of the axes of said hub and aligning members and permitting limited adjustment in the angular relationship between said axes, said tension bolt having a nut thereon adjustable to lock the pivotal joints fixing the axial relationship of the hub and aligning members.

References Cited in the file of this patent

UNITED STATES PATENTS

| | | |
|---|---|---|
| 1,337,646 | Eckart | Apr. 20, 1920 |
| 1,447,549 | Eckert | Dec. 18, 1923 |
| 1,831,382 | Gairing | Nov. 10, 1931 |
| 2,532,058 | Clark | Nov. 28, 1950 |
| 2,675,242 | Olson | Apr. 13, 1954 |